US011580613B2

(12) United States Patent
Wagner et al.

(10) Patent No.: US 11,580,613 B2
(45) Date of Patent: Feb. 14, 2023

(54) PARCEL CONVEYANCE SYSTEM

(71) Applicant: Light Line Delivery Corp., Cambridge, MA (US)

(72) Inventors: Brett Wagner, Cambridge, MA (US); Sarveshwaran Jayaraman, Cambridge, MA (US); Victor Dubinsky, Cambridge, MA (US)

(*) Notice: Subject to any disclaimer, the term of this patent is extended or adjusted under 35 U.S.C. 154(b) by 483 days.

(21) Appl. No.: 16/456,224

(22) Filed: Jun. 28, 2019

(65) Prior Publication Data
US 2020/0410621 A1 Dec. 31, 2020

(51) Int. Cl.
*G06Q 50/28* (2012.01)
*G06K 7/10* (2006.01)
(Continued)

(52) U.S. Cl.
CPC .......... *G06Q 50/28* (2013.01); *G05D 1/0027* (2013.01); *G05D 1/0297* (2013.01); *G05D 1/101* (2013.01);
(Continued)

(58) Field of Classification Search
CPC .......... B64C 39/02; B64C 27/04; G05D 1/00; G05D 1/10; G05D 1/02; G05D 1/04; G05D 1/06; G05D 1/0297; G05D 1/12; G05D 1/101; G05D 1/0027; G05D 2201/0216; G08G 5/00; G08G 1/16; G08G 5/02; G06Q 10/08; G06Q 50/28; G06Q 10/00; G06Q 10/04; G06Q 30/02; G06Q 30/06; G06Q 50/30; B64D 1/08; B64D 1/22; B64D 1/02; B64D 1/12; G06F 17/00; A47G 29/12; A47G 29/122; A63H 27/00; B07C 5/36; B07C 5/38; B25J 9/16; B64F 1/12; B64F 1/22; B64F 1/32; B65D 25/00;
(Continued)

(56) References Cited

U.S. PATENT DOCUMENTS 6,289,260 B1 * 9/2001 Bradley ............... B65G 1/1376
414/280
6,418,352 B1 * 7/2002 Ellis ................... G05B 19/4183
700/116
(Continued)

FOREIGN PATENT DOCUMENTS

DE 202016006793 1/2017
WO 2014080390 5/2014
(Continued)

*Primary Examiner* — Bhavesh V Amin
(74) *Attorney, Agent, or Firm* — Lambert Shortell & Connaughton; David J. Connaughton, Jr.; Justin P. Tinger

(57) ABSTRACT

A parcel delivery system is provided for use in complex having a plurality of tenant units each having a tenant address, wherein the complex further comprising an intake facility, a delivery facility, and parcel storage boxes, and wherein the intake facility comprises a scanning station and a first automated ground delivery vehicle in communication with the scanning station and wherein the delivery facility comprises a second automated ground delivery vehicle configured to travel between the delivery station and tenant units. In accordance with embodiments, a computer system interfaces with the parcel delivery system to notify tenants when they have a parcel and to further notify tenants when delivery of the parcel has been completed.

20 Claims, 3 Drawing Sheets

(51) Int. Cl.
  *G05D 1/02* (2020.01)
  *G05D 1/12* (2006.01)
  *G05D 1/10* (2006.01)
  *G05D 1/00* (2006.01)
  *G07C 9/28* (2020.01)

(52) U.S. Cl.
  CPC ........... *G05D 1/12* (2013.01); *G06K 7/10366* (2013.01); *G07C 9/28* (2020.01); *G05D 2201/0216* (2013.01)

(58) Field of Classification Search
  CPC .......... B65D 5/36; B65G 43/00; B65G 51/02; F21S 8/08; G01C 21/00; G01C 21/20; G01C 21/34; G08B 1/08; G07C 9/28; G07C 9/00896; G06K 7/10366
  See application file for complete search history.

(56) References Cited

U.S. PATENT DOCUMENTS

| | | | |
|---|---|---|---|
| 6,496,806 B1* | 12/2002 | Horwitz | G06Q 10/087 705/28 |
| 6,705,523 B1* | 3/2004 | Stamm | G06Q 10/08 235/383 |
| 6,933,849 B2* | 8/2005 | Sawyer | G01S 7/003 705/28 |
| 7,348,884 B2* | 3/2008 | Higham | G06Q 20/203 700/229 |
| 7,797,204 B2* | 9/2010 | Balent | G06Q 30/0633 705/28 |
| 7,973,641 B1* | 7/2011 | Huang | B60R 25/00 340/10.52 |
| 8,058,990 B2 | 11/2011 | Mullen | |
| 8,857,709 B2 | 10/2014 | Hancock | |
| 9,244,147 B1* | 1/2016 | Soundararajan | G01S 1/08 |
| 9,359,074 B2 | 6/2016 | Ganesh | |
| 9,412,280 B1* | 8/2016 | Zwillinger | G05D 1/0676 |
| 9,527,605 B1 | 12/2016 | Gentry | |
| 9,760,087 B2 | 9/2017 | Hoareau | |
| 9,792,576 B1* | 10/2017 | Jamjoom | B64C 39/024 |
| 9,809,305 B2 | 11/2017 | Buchmueller | |
| 9,926,078 B2 | 3/2018 | Bonazzoli | |
| 10,022,753 B2 | 7/2018 | Chelian | |
| 10,026,054 B1* | 7/2018 | Staton | B65D 25/00 |
| 10,157,337 B1* | 12/2018 | Kantor | G08B 13/14 |
| 10,163,177 B2 | 12/2018 | Farris | |
| 10,233,021 B1* | 3/2019 | Brady | G06Q 10/047 |
| 10,248,120 B1* | 4/2019 | Siegel | G05D 1/0022 |
| 10,308,430 B1* | 6/2019 | Brady | G05D 1/0278 |
| 10,310,499 B1* | 6/2019 | Brady | G05D 1/0278 |
| 10,310,500 B1* | 6/2019 | Brady | G05D 1/0291 |
| 10,592,843 B2* | 3/2020 | Natarajan | G06Q 10/0832 |
| 11,458,633 B2* | 10/2022 | Ukisu | B25J 9/1697 |
| 11,458,695 B2* | 10/2022 | Ataka | B29C 70/54 |
| 11,459,221 B2* | 10/2022 | Levasseur | B65G 57/00 |
| 11,460,520 B2* | 10/2022 | Suga | G01D 5/145 |
| 11,460,849 B2* | 10/2022 | Deyle | G05D 1/0088 |
| 11,461,717 B2* | 10/2022 | McCormack | G06Q 10/06315 |
| 2001/0040512 A1* | 11/2001 | Hines | G07C 9/28 340/8.1 |
| 2002/0089434 A1* | 7/2002 | Ghazarian | G06Q 10/08 340/988 |
| 2002/0104013 A1* | 8/2002 | Ghazarian | G08B 13/2454 726/27 |
| 2002/0130778 A1* | 9/2002 | Nicholson | G08B 13/2414 340/572.1 |
| 2002/0170952 A1* | 11/2002 | Alsafadi | D06F 93/005 235/375 |
| 2003/0028323 A1* | 2/2003 | Zeitler | G01S 5/14 701/408 |
| 2003/0080901 A1* | 5/2003 | Piotrowski | G01S 13/751 342/386 |
| 2003/0085267 A1* | 5/2003 | Piotrowski | G06Q 30/02 235/375 |
| 2003/0088496 A1* | 5/2003 | Piotrowski | G06Q 30/02 705/37 |
| 2004/0195078 A1* | 10/2004 | Anderson | B65G 47/261 198/781.05 |
| 2005/0131645 A1* | 6/2005 | Panopoulos | G05D 1/0244 701/472 |
| 2005/0246248 A1* | 11/2005 | Vesuna | G06K 7/0008 705/28 |
| 2006/0006999 A1* | 1/2006 | Walczyk | G06Q 10/08 340/572.1 |
| 2006/0022827 A1* | 2/2006 | Higham | G08B 13/2417 340/572.1 |
| 2006/0033623 A1* | 2/2006 | Hines | G08B 21/0227 340/572.1 |
| 2007/0001809 A1* | 1/2007 | Kodukula | G07F 9/026 340/572.7 |
| 2008/0167817 A1* | 7/2008 | Hessler | G01C 21/005 701/514 |
| 2012/0191272 A1* | 7/2012 | Andersen | B66F 9/24 705/28 |
| 2013/0240673 A1* | 9/2013 | Schlosser | B64C 39/024 701/3 |
| 2014/0032034 A1* | 1/2014 | Raptopoulos | H04B 7/18506 701/25 |
| 2014/0197926 A1* | 7/2014 | Nikitin | G06K 7/10108 340/10.1 |
| 2014/0254896 A1* | 9/2014 | Zhou | G06Q 20/40145 705/16 |
| 2015/0006005 A1* | 1/2015 | Yu | G06Q 50/28 701/22 |
| 2015/0100439 A1* | 4/2015 | Lu | B25J 9/1602 901/1 |
| 2015/0317597 A1* | 11/2015 | Shucker | G06K 19/06037 235/375 |
| 2015/0370251 A1* | 12/2015 | Siegel | B64C 39/024 701/2 |
| 2016/0033966 A1* | 2/2016 | Farris | A47G 29/122 701/16 |
| 2016/0068264 A1* | 3/2016 | Ganesh | G06Q 10/083 701/4 |
| 2016/0163204 A1* | 6/2016 | Raptopoulos | H04B 7/18506 701/3 |
| 2016/0221186 A1 | 8/2016 | Perrone | |
| 2016/0314429 A1* | 10/2016 | Gillen | G01S 19/13 |
| 2017/0011333 A1* | 1/2017 | Greiner | B64D 1/02 |
| 2017/0011340 A1 | 1/2017 | Gabbai | |
| 2017/0038780 A1* | 2/2017 | Fandetti | G06Q 10/083 |
| 2017/0076354 A1* | 3/2017 | High | G06Q 30/0639 |
| 2017/0148328 A1* | 5/2017 | Chan | B64C 39/024 |
| 2017/0190510 A1* | 7/2017 | Porat | B64F 1/32 |
| 2017/0293301 A1* | 10/2017 | Myslinski | H04N 7/183 |
| 2017/0293991 A1* | 10/2017 | High | B64C 39/024 |
| 2017/0301004 A1* | 10/2017 | Chirnomas | G07F 11/26 |
| 2017/0323259 A1* | 11/2017 | Gillen | G06Q 10/0833 |
| 2017/0323545 A1* | 11/2017 | Gillen | G08B 13/19656 |
| 2018/0005169 A1* | 1/2018 | High | G06Q 10/06315 |
| 2018/0011491 A1* | 1/2018 | Morton | G05B 19/41895 |
| 2018/0031296 A1* | 2/2018 | Winkle | F25D 3/125 |
| 2018/0088598 A1* | 3/2018 | Lection | G05D 1/104 |
| 2018/0101817 A1* | 4/2018 | Lection | B64D 45/08 |
| 2018/0121877 A1* | 5/2018 | Doherty | G08G 5/006 |
| 2018/0164818 A1* | 6/2018 | Wilkinson | G01S 5/0027 |
| 2018/0197137 A1* | 7/2018 | High | G06Q 30/0202 |
| 2018/0203465 A1* | 7/2018 | Suzuki | B64D 1/12 |
| 2018/0218320 A1* | 8/2018 | Lee | G06K 17/0029 |
| 2018/0281946 A1* | 10/2018 | Obaidi | G08G 5/0082 |
| 2018/0300834 A1* | 10/2018 | High | G06Q 50/28 |
| 2018/0330313 A1* | 11/2018 | Clarke | B60P 3/007 |
| 2018/0336751 A1* | 11/2018 | Wilkinson | G05D 1/0225 |
| 2018/0342007 A1* | 11/2018 | Brannigan | G06Q 30/0643 |
| 2019/0043007 A1* | 2/2019 | Staton | B65D 5/36 |
| 2019/0051090 A1* | 2/2019 | Goldberg | G07F 11/46 |
| 2019/0061939 A1* | 2/2019 | Anand | B64C 39/024 |
| 2019/0072979 A1* | 3/2019 | Sukhomlinov | G06Q 50/30 |
| 2019/0095862 A1* | 3/2019 | Kilzer | G05D 1/0088 |
| 2019/0220819 A1* | 7/2019 | Banvait | G06Q 10/0832 |
| 2019/0265717 A1* | 8/2019 | McHale | B64C 39/024 |

(56) References Cited

U.S. PATENT DOCUMENTS

2019/0392380 A1* 12/2019 O'Brien .............. G06Q 10/087
2020/0019925 A1*  1/2020 Tokhtabaev ............ B64D 9/00
2020/0410621 A1* 12/2020 Wagner .............. G06K 7/10366
2022/0312255 A1*  9/2022 Kuwahara ........... H04W 64/003

FOREIGN PATENT DOCUMENTS

| WO | 2017213324 | 12/2017 |
| WO | 2018111260 | 6/2018 |

* cited by examiner

PARCEL CONVEYANCE SYSTEM

FIELD OF INVENTION

The present disclosure relates to parcel delivery, and more specifically, to systems and methods for securely delivering parcels to tenants in a complex. The disclosed systems and methods advantageously reduce, and in some instances, eliminate, the need for a third parties, that is, a property managers or associated workers, from handling a tenant's parcel. The systems and methods disclosed herein thus not only provide enhanced security and improved delivery service amenities to tenants, but also reduce the man hours and associated cost otherwise required by the complex to deliver parcels to tenants.

BACKGROUND

Mail and parcel delivery is a crucial service provided to tenants of both residential and commercial properties. Mail, that is, letters and other small envelopes, are often delivered directly by a mail carrier to a tenant's mailbox. In complexes, tenants often have an address that corresponds to a locked mailbox in a single mail room or common area whereby mail carriers sort and deliver envelopes to each respective mailbox address. However, parcels that do not fit in mailboxes must be stored in an area where tenants can retrieve their parcels or alternatively, parcels must be delivered to tenants' doors by employee or contractors working for the complex. Current parcel storage and delivery methods do not fully address the concerns and inefficiencies, both for tenants and for complex owners.

Logistically, parcels must be stored somewhere, whether it be in an area to which tenants have access or in an area accessed only by complex employees/contractors. If the complex does not provide doorstep delivery and opts to store parcels in a "mail room" area, parcels that are not promptly retrieved by tenants take up valuable space, and large number of package deliveries may lead to package room overflow. Further, at a minimum, tenants generally require that other tenants not be able to freely take parcels not belonging to them. Thus, any mail room must be staffed by at least one employee to ensure no theft or inadvertent taking of parcels occurs. Such an arrangement likely places limits on the hours when which the mail room can be staffed and in turn, limits the time frames in which tenants can retrieve their parcels.

As a solution to limited tenant package pickup hours, some complexes have attempted to implement 24 hour locker systems akin to traditional mailboxes. In such systems, parcels are placed in lockers by parcel delivery carriers in the same way traditional mail is placed in mailboxes. However, lockers have several limitations. First, not all parcel delivery carriers may be willing to use parcel lockers. Second, tenants must leave their unit and go to the parcel locker site to retrieve their parcels, which tenants may find objectionable, particularly if the parcel locker site is far away from their unit and if they regularly must retrieve heavy parcels. Lastly, package lockers do not solve the problem of package overflow, and are arguably even less space efficient than package rooms.

In contrast, if the complex provides parcel delivery to tenants' doors, parcels may be delivered when tenants are not present. To avoid repeated delivery attempts and inefficient use of resources, complex or third-party couriers may leave parcels outside the tenant's door. This creates a security risk whereby the parcel is freely accessible to passersby. This may be unsatisfactory to tenants. The complex may alternatively offer to deliver packages within units regardless of if tenants are home, however tenants may object to having their unit entered into when they are not present. Moreover, this may give rise to tenant complaints of theft from units, a risk complexes may be unwilling to take. Coordinating delivery times and confirming tenants are present to accept parcel delivery is, however, time consuming and resource intensive, and thus might not be favorable to complex owners. In either instance, the complex must enlist employees/contractors to perform deliveries. This further requires complex resources and results in complex employees handling tenants' parcels. Tenants may desire a more private parcel delivery experience and complexes may wish to free up valuable resources for performing other day to day tasks.

The logistical, security, and privacy pain points associated with parcel delivery are further exacerbated as more and more shopping is done online, which drastically increases the number of packages received by a given complex. Therefore, there is a need for secure and efficient parcel delivery systems and methods that can be implemented in both residential and commercial complexes that reduce intervention by complex employees and enhance tenants' parcel delivery experience.

SUMMARY OF THE INVENTION

In accordance with aspects and embodiments, a parcel delivery system is provided comprising a complex having a plurality of tenant units, each having a tenant address; the complex further comprises of an intake facility, a delivery facility, and parcel storage boxes, a parcel bearing an address of the tenant, and wherein the intake facility comprises a scanning station and a first automated ground delivery vehicle in communication with the scanning station, and wherein the delivery facility comprises of a second automated ground delivery vehicle configured to travel between the delivery facility and tenant units. The parcel delivery system utilizes the second automated ground delivery vehicle to deliver the parcel to the one of the plurality of units from the delivery facility. In certain embodiments, the intake facility and delivery facility may be in the same area or region of the complex, and may use the same parcel storage boxes or same storage areas.

In accordance with embodiments, the scanning station scans a barcode on the at least one parcel to collect destination information. And the destination information comprises the address of the tenant, tracking number, and related information necessary for delivering a parcel to the tenant's door. In other embodiments, the scanning station may be integrated with the first automated ground delivery vehicle, for example on a top of the first automated ground delivery vehicle.

In accordance with embodiments, the destination information is communicated to the first automated ground delivery vehicle, and the first automated ground delivery vehicle places the parcel in a parcel storage locker corresponding to the address of the tenant. The storage locker that corresponds to the tenant's address need not be the same locker for every delivery for the tenant.

In accordance with embodiments, the second automated ground delivery vehicle is configured to access the parcel stored in the parcel storage box and is configured to open the parcel storage box door in the delivery facility by transmitting an RFID, Bluetooth, Wi-Fi, or any other signal obvious to one familiar in the art, to a corresponding receiver on the parcel storage box door or a receiver on the locker. The second automated ground delivery vehicle is further configured to retrieve the parcel from the parcel storage box and deliver the parcel to the unit corresponding to the address of the tenant.

In accordance with embodiments, delivery may be made to a secure doorstep storage box located outside the tenant's unit, into the tenant's unit by inserting the parcel through secure access door, or directly to the tenant associated with the tenant unit.

In accordance with aspects and embodiments, a computer system is provided that is in communication with the scanning station, and when the computer system receives the destination information from the scanner, the computer provides an output to a computer or mobile phone associated with the address of the tenant stating that a parcel has been received bearing the address of the tenant. The tenant can then use their computer or mobile phone to provide an input information to the computer system via a networked communication to indicate when they would like the parcel to be delivered.

In accordance with embodiments, the information input by the tenant is processed by the computer system and communicated to the second automated ground delivery vehicle at the requested delivery time. When delivery has been completed, the second automated ground delivery vehicle sends delivery confirmation information to the computer system, and the computer system provides a notification output to the computer associated with tenant that delivery has been completed.

DETAILED DESCRIPTION

Figure 1:
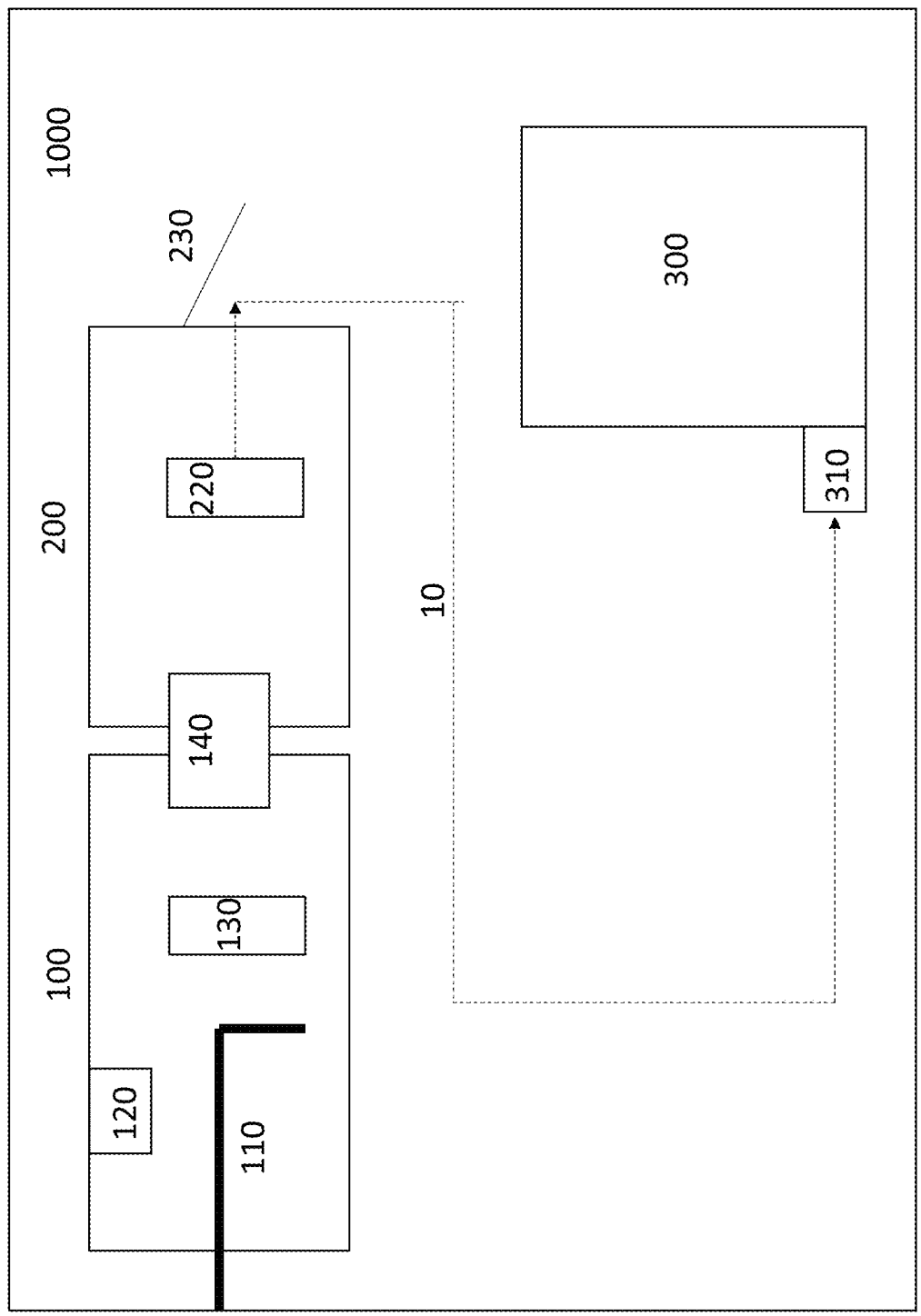
FIG. 1 is a system diagram of a parcel delivery service in accordance with aspects and embodiments.

The parcel delivery systems and methods disclosed herein provide a cost-effective delivery service for the complex while maximizing tenant security and privacy. The systems and methods disclosed minimize parcel theft risk and complex staff time dedicated to handling and delivering packages. Additionally, tenants' experience is enhanced by eliminating the need to wait in line or walk a distance to retrieve a parcel. As used herein, "complex" refers to any property, commercial or residential, having a plurality of units occupied by tenants, a tenant is any individual with authority to act on behalf of the lessee of the unit, whether or not they themselves are the named lessee. As used herein, "parcel" refers to any package or letter delivered to the complex via any mail carrier, public of private.

The systems and methods disclosed herein advantageously make use of autonomous and remote technologies and provide parcel delivery to tenants of a complex. In a first aspect, parcels are received by the complex by carriers. These carriers include, but are not limited to, the United States Postal Service, FedEx, UPS, DHL, and the like. The parcels are received by an intake facility located on and operated by the complex. After being received by the intake facility, parcels are delivered to tenants.

In accordance with embodiments, the intake facility may operate autonomously or semi autonomously. Parcels may be received at a loading point having a conveyor belt. The conveyor belt in turn may carry parcels to a scanning station whereby they are scanned for a barcode generated by the carrier that shipped the parcel. This scanning may be manual or remote. Any barcode or other identifier such as a chip, marker, or the like, is scanned by the scanning station and the information contained therein, specifically, the destination address, is extrapolated. The scanning station communicates the extrapolated information to first automated ground delivery vehicle which removes the parcel from the conveyor belt and places the parcel in a locker corresponding to the destination address, i.e., that of a unit in the complex. Parcels not having a barcode or not having a barcode containing sufficient destination information may be placed in a separate area of the intake facility to be sorted and placed in the appropriate storage locker by a complex employee. The storage lockers may be of dimensions to fit parcels only of a given size, and oversized parcels may be stored elsewhere. The dimensions of the storage locker may correspond the dimensions of secure doorstep delivery boxes and secure access doors located at tenants' units and used for secure parcel delivery. In a further embodiment, parcels may be manually organized and stored.

An automated ground delivery vehicle, also referred to herein as an unmanned autonomous ground vehicle (UGV), may remove the parcel from the conveyor belt (or wherever the parcel is located) and place the parcel in the appropriate storage locker or area of the intake facility. In another embodiment, a first UGV may retrieve the parcel from the intake facility and directly transfer it to a second UGV, with the second UGV being programmed to deliver the parcel to a tenant's unit. The UGVs disclosed herein may have an onboard computer system able to acquire, process, and store information from several independent sources. The UGVs may further be equipped with scanning devices, signaling devices, distance sensors, object sensors, measuring and weighing devices, and other sensors, features, and capabilities known in the art. In further embodiments, the UGV may pick up newly delivered parcels, scan them, and then deliver them to the appropriate storage locker or area of the intake facility.

To open a storage locker containing a parcel, or to place a parcel in a storage locker for later delivery, the UGV may, for example, interact with the locker to unlock it. The UGV may have a proximity RFID (or other sensors) feature that causes the locker to open when approached. The storage lockers may have a front door and a back door, where the back door is accessible from the intake facility and the front door is accessible from a delivery facility adjacent the intake facility. The RFID signal transmitted by the UGV may be universal to all doors of all storage lockers or may, alternatively, be unique to the intake side and the delivery side, or alternatively, unique to each locker. In embodiments where each locker has a unique RFID code to open the locker's door, the intake station locker door code may be given to the UGV as part of the command provided to the UGV by the scanning station to place the parcel in a locker, and the delivery station door code may be given to the UGV as part of a remote command provided to the UGV to deliver a given parcel. The locker in turn may have bar code, sensor, or other scannable or transmittable information able to be accessed and processed by the UGV to confirm to the UGV it has accessed the correct locker. The UGV may, for example, scan a barcode on the storage locker that corresponds to the destination of the parcels contained therein.

The manner in which the UGV opens the storage locker and obtains the destination information will be readily ascertained by those of skill in the art. After having opened the locker and received the destination address information, the UGV removes the parcel from the locker and navigates to the destination.

Alternatively, the scanning station in the intake facility may communicate directly with a UGV to provide it with destination information. The UGV may receive destination information for a given parcel and remove the parcel from the intake station conveyer belt and navigate directly to the destination, without the need for the parcel to be stored in a storage locker prior to delivery.

To ensure parcels are secured upon delivery, each unit of the complex may be equipped with a secure doorstep box (SDB). The SDB may have dimensions to accommodate parcels up to a given size. The UGV, when delivering a parcel having a size receivable by an SBD, may open the SBD. The UGV may use the same method for opening the SDB used for opening storage lockers in the intake facility, and may, for example, use an RFID transmitter that, when in proximity with an SDB, opens the SDB. To ensure an SDB is only opened when a parcel is being delivered, the UGV may only transmit RFID signals when in possession of a parcel, and more specifically, when the UGV has arrived at a destination for which it has a parcel. The UGV may, for example, when receiving destination information be provided with the exact distance it must travel on a pre-defined path to arrive at the destination. The UGV may employ wheel sensors to monitor the distance it has traveled such that transmitting can be turned on when within a given range of the destination SDB. Transmitting may be disabled at all other times, i.e., all other distances outside of the given range, to ensure UGVs passing SDBs for which they do not have parcels are not inadvertently opened. Alternatively, the SDB itself may be outfitted with a transmitting feature able to signal to the UGV proximity, which causes the UGV to turn on the RFID transmitting feature to open the SDB.

After the SDB is opened, the UGV places the parcel in the SDB. After the operation is complete, the SDB may automatically close or the UGV may further transmit a close and lock signal to the SDB. In accordance with embodiments, the UGV may instead deliver parcels within tenant's units. Unit entry way doors may be outfitted with secure access doors formed therein, much like that of a pet door which the UGV can open to insert a parcel and subsequently close in the same manner as that of an SDB. After delivering a parcel into an SDB or into a unit via a secure access door, the UGV may either return to the intake facility or navigate to a next destination for which it has a parcel.

When delivering several parcels in a single trip, the UGV may identify parcels associated with a given address by processing information about the dimensions and weight of the parcel when it removes it from the conveyor belt or storage locker. By processing the parcel's exact size and weight in connection with the destination address, the UGV will be able to differentiate parcels from one another and deliver the correct parcel to the correct destination while carrying several parcels for delivery on a single trip.

In accordance with embodiments, parcels may alternatively be received at air drone stations. When a parcel is received at a designated air drone station, a UGV equipped with scanning features similar to that of the intake facility scanning station scans the parcel. UGVs at air drone stations may further have on board cameras able to evaluate printed addresses absent barcode information to ensure prompt delivery. Once the intended address is identified by the UGV, the UGV navigates to the intended destination in the same manner as UGVs traveling from the intake facility or UGVs that have retrieved parcels from storage lockers. The air drone station or stations may be located as part of the intake facility, or at a separate location at the complex from the intake facility, though in either instance is considered herein to be part of the intake facility, even if located remotely from the intake facility. In some embodiments, the UGV may transfer the parcel from the air drone station to the intake facility, such as to a locker or storage area of the intake facility. In another embodiment, the UGV may retrieve the parcel from the air drone station for delivery directly to the tenant's unit. In one embodiment, the air drone station may be such as that disclosed in U.S. Pat. No. 9,975,651, which is herein incorporated by reference in its entirety.

In accordance with embodiments, the complex and the UGVs may be outfitted with features that facilitate the UGVs' ability to navigate the complex. The storage lockers of the intake and/or delivery facility may be outfitted with automatic doors that open as the UGVs approach. These doors may open only upon approach by a UGV and in response to an RFID signal, thus ensuring facility security. Additionally, the complex may be outfitted with sensors along paths where which the UGVs travel to aid the UGVs. The UGVs may further use light detection and ranging (LIDAR), onboard cameras, and other systems known in the art to map the terrain of the complex to enable delivery of parcels. UGVs may be outfitted with special stair climbing capabilities and may be able to access and control elevators within the complex to further facilitate parcel delivery.

In accordance with aspects and embodiments, the parcel delivery disclosed is aided and controlled by computer system have an application which comprises programming. This computer system may be operable over a network. The computer system may to operate on the complex's intranet, on the internet, or both. The parcel delivery computer system may notify tenants when a parcel has been received for them at the intake station by, for example, providing an output information and/or signal through the network to a computer/computerized device of the tenant. Tenants may then be able to schedule delivery times by providing a communication, using their computer/computerized device by sending a transmission through the network which is received by the computerized system which in turn provides instructions to an onboard computer of the UGV.

In some embodiments, when parcels are scanned by the scanning station at the intake facility, a tenant whose unit corresponds to the destination information scanned will be notified that they have received a parcel. In this embodiment, the scanning station may be in communication with the computer system that may send an automated email to the tenant. The tenant, upon receipt of the email, may use their computer/computerized device to, through the network provide an input to the computer system with instructions on how to proceed. If the parcel has been determined to be oversized and not capable of UGV delivery, the tenant may instead be notified that separate delivery arrangements need to be made.

The parcel delivery computer system may alternatively, or in addition, send the tenant a cell phone text notification or make an automated phone call to the tenant.

The parcel delivery computer system may be implemented on a web-based portal interface accessible by tenants via secure log-in credentials. Alternatively, the system may be programmed as a computer desktop application, or may be a mobile application for use on a smart phone, or the application may be in the form of and accessible in any combination thereof. A tenant may access the parcel delivery computer system on their chosen platform and the system may provide a display having a user interface where the tenant can input information into the parcel delivery system. The interface may also display previous parcel deliveries made to the tenant, including parcel characteristics, the date and time when the parcel was received at the intake facility, the date and time when the tenant requested the parcel be delivered, and the date and time when the parcel was delivered to the tenant. This parcel delivery log may further assist complex management in ensuring quality control of the parcel delivery service.

Upon receiving notification that a parcel has been received at the intake facility for the tenant, the tenant may use their computer/computerized device to access the computerized system database through the network and provide an input as to when the tenant would like the parcel to be delivered. If the tenant wishes for the parcel to be delivered immediately, they can so identify, and a UGV in the delivery station will remove the parcel from the corresponding storage locker, or if the parcel has not yet been placed in a locker, a UGV designated for making deliveries will remove the parcel directly from the conveyor belt and deliver the parcel. Alternatively, the tenant can indicate a future date and window of time when they would like the parcel to be delivered.

The tenant may further specify the manner in which they would like delivery to be made. In certain embodiments, a tenant may have a secure access door formed as an opening on a door to the tenant's unit, this secure access door is large enough to allow passage of parcels of various sizes and in some cases the UGV, but in most cases is small enough to prevent passage of a person. The secure access door is openable to allow delivery of the parcel, and closable to be secure and prevent unwanted access to the tenant's unit. In a particular embodiment, the secure access door may have a motorized or otherwise controllable door which may allow it to open fully, or only partially. For example, the door may slide between a closed positon and an open position, and may be controllable to stop in one of many partially open position. Similar operability of a hinged door or any other door is also contemplated. A computerized controller may be operable to control the position of the door by control of the motor. A wireless signal receiver may be in communication with the computerized controller and can receive inputs from, for example, the UGV or a central computer system to instruct it to open just enough to allow access of the parcel to be delivered. In certain further embodiments, a similarly operable access door may be positioned anywhere else in the facility to allow passage of the parcel-carrying UGV without having to fully open a door—thereby adding to security throughout the complex.

The secure access door is, in most embodiments, powered by electrical components. Electrical power may be connected to the secure access door by direct wiring, or battery. In another embodiment, the UGV may carry an electrical power source such as a battery or batteries which can, through electrical connection to a plug or other electrical connector, provide the required electrical power to operate the motor of the secure access door. In a further embodiment, the power source may be removable from the UGV and can stay engaged with the secure access door while the UGV continues to deliver the parcel, and can be retrieved by the UGV upon completion of delivery.

In still another embodiment, the secure access door may be physically openable by the UGV, such as by the UGV having a movable or rotatable tool engageable in a keyed or other secure manner with a receiver on the door. The UGV may then operate the tool to cause the door to fully and/or partially open, and then close. For example, the tool may engage a gear on the secure access door, which can cause movement of the door through the gear teeth being engaged with the door.

If the tenant has a SDB or secure access door, the tenant can use the networked interface to the computer system to specify that the parcel should be left in the SDB/inside the unit via the secure access door. Alternatively, the tenant can specify that they would like in-person delivery. In accordance with embodiments, the UGV can navigate to its destination and wait outside a tenant's door. When the UGV is in close proximity to the tenant's door, the tenant can be notified of the UGV's arrival via any known means. The tenant can then take the parcel from the UGV. Once the parcel has been removed from the UGV, the tenant may be required to confirm receipt by interfacing with the UGV, either by pressing a button on the UGV, waiving a key fob at a sensor on the UGV, or any other known means. In each instance, the delivery of the parcel may be processed by the UGV to update the parcel delivery system data. In some embodiments, an automated confirmation of delivery email to be sent to the tenant.

Figure 2:
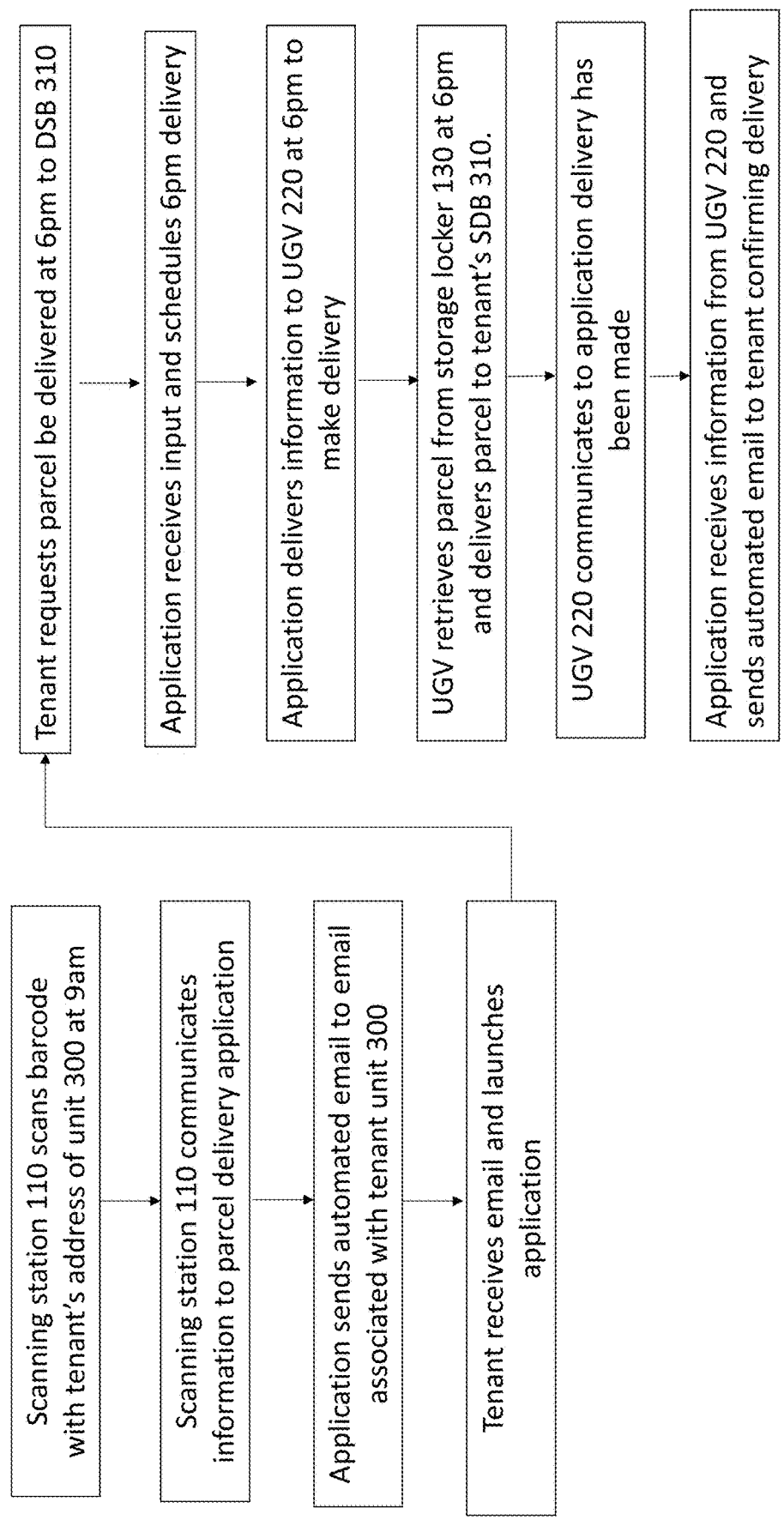
FIG. 2 is a process tree of a parcel delivery computer system in accordance with aspects and embodiments.

The systems and methods disclosed herein will now be illustrated by the example corresponding to FIGS. 1 and 2. Referring to FIG. 1, a parcel is received at intake facility 100 on complex 1000. The parcel is received on conveyor belt 110 and carried by conveyor belt 110 to scanning station 120. Scanning station 120 scans the parcel for any barcodes containing information concerning the intended destination of the parcel. Referring simultaneously now to FIG. 1, once scanning station 120 receives the destination information from a barcode on the parcel that the parcel is to be delivered to tenant unit 300, scanning station 120 communications the delivery information to the parcel delivery computer system. At intake facility 100, intake facility UGV 130 receives information from scanning station 120 about the parcel's intended destination, removes the parcel from conveyor belt 110, and places it in storage locker 140 corresponding to unit 300.

Referring to FIG. 2, once the parcel delivery computer system receives information from scanning station 110, it identifies the email address corresponding with the tenant address identified by the scanning station 110, i.e., unit 300, and sends an automated email to the tenant associated with unit 300 notifying them that a parcel has been received for them. The tenant then may use their computer/computerized device to access the parcel delivery computer system and provides an input to the system to select when and where they would like the parcel delivered. The tenant can then select a delayed delivery of later in the day, for example, if notified at 9 am, the tenant can select a delivery time of 6 pm, and can specify that delivery be made to the tenant's DSB. The information input into the computer system by the tenant is communicated to delivery station UGV 220 when delivery is to be made. The communicated information from the computerized system activates UGV 220 to begin the delivery process.

Referring back now to FIG. 1, at 6 pm when the computer system communicates delivery information to UGV 220, UGV 220 in delivery station 200 begins the delivery process. UGV 220 opens storage locker 140 from the delivery station 200 side and retrieves the parcel. UGV 220 then exists delivery station 200 via secure automated door 230 and travels through complex 1000 along path 10 to deliver the parcel. UGV 220 arrives at unit 300 with the parcel and places the parcel in SDB 310. During the travel of the UGV 220, there may be additional secure automated doors which may open upon approach by the UGV. Referring again to FIG. 2, UGV 220 communicates that delivery is complete with the parcel delivery computer system and a second email is sent to the tenant confirming delivery has been made.

Figure 3:
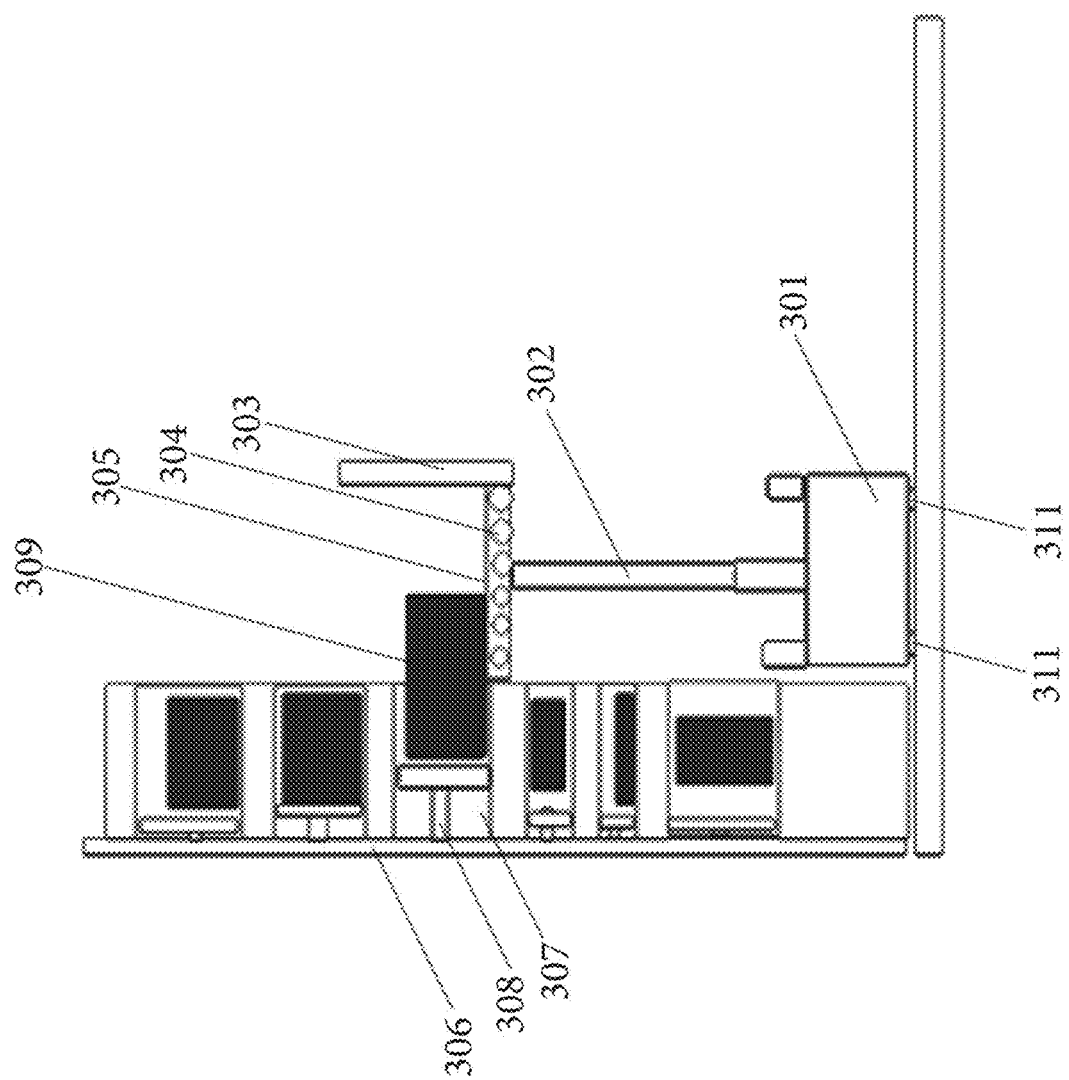
FIG. 3 provides a view of an embodiment of a locker having a mechanism to transfer a parcel stored therein to the unmanned autonomous ground vehicle.

Turning to FIG. 3, a view of an embodiment of a locker having a mechanism to automatically transfer a parcel stored therein to a UGV is provided. It is anticipated that in many instances, transferring a parcel out of a locker may be challenging. For example, the package may be heavy, or awkwardly shaped, in such a way that it would prevent a high probability of transfer. The easier it is to remove the parcel from the locker automatically, the more reliable the inventive system will be. Therefore, the system may utilize any solution to remove the structure therefrom. For example, a movable wall may urge the parcel out, as shown in the figure. Also, a conveyor, rollers, or other similar movement system may urge the parcel out of the locker.

One embodiment of facilitating parcel transfer is seen in FIG. 3. In this view, a UGV 301 has a top platform 303 which is vertically movable using telescoping shaft 302. Motorized wheels 311 allow movement of the UGV 301. A plurality of lockers 306 are accessible to the UGV 301. Upon receipt of computerized instructions, the UGV 301 is operable to pull up to the appropriate locker 306, and vertically position the top platform 303 adjacent to the desired locker. A signal may be provided from the UGV 301 or other computerized source to the particular locker. A door of the locker may open and a movable locker wall or plate 308 extends, reducing the volume of the locker and urging the parcel 309 out of the locker volume 307. In a further embodiment, as shown, the UGV 301 top platform 303 may have a conveyor 305 with a plurality of rollers 304 which even further facilitates receipt of the parcel 309. The conveyor may be motorized to forcefully receive the parcel 309, or may be non-motorized to provide a low friction surface to receive the parcel 309. The UGV 301 may either keep the top platform 303 in the extended position, or bring it down closer to the base of the UGV for transportation to the desired tenant unit.

In further embodiments of any of the embodiments disclosed above, the parcel delivery system operational steps may be reversed, such that they system may retrieve a package from a tenant's unit, return it to the delivery facility, where it can then be picked up by a parcel delivery service from either the delivery facility or after being transferred to the intake facility. This may be implemented using the tenant's computer system in communication with the computer system of the delivery system to provide instructions for the pick-up and transfer in a similar and reversed order of operation from the above delivery system.

Although certain representative embodiments and advantages have been described in detail, it will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. A parcel delivery system comprising:
a complex having a plurality of tenant units each having a tenant address, the complex further comprising an intake facility, a delivery facility, and parcel storage boxes in communication with both the intake facility and the delivery facility;
a parcel for delivery to one of the plurality of tenant units bearing an address of a tenant;
wherein the intake facility comprises a scanning station and a first automated ground delivery vehicle in communication with the scanning station and wherein the delivery facility comprises a second automated ground delivery vehicle configured to automatically travel between the delivery facility and the plurality of tenant units; and wherein the second automated ground delivery vehicle is operable to deliver the parcel to the one of the plurality of units from the delivery facility;
wherein the scanning station scans a barcode of the at least one parcel to collect a destination information; and
wherein the second automated ground delivery vehicle comprises an electrical source, the electrical source connectable to a motor of a secure access door controller and operable to provide an electrical power to operate the motor.

2. The system of claim 1, wherein the destination information comprises the address of the tenant.

3. The system of claim 2, wherein the destination information is communicated to the first automated ground delivery vehicle.

4. The system of claim 3, wherein the first automated ground delivery vehicle places the parcel in a parcel storage locker corresponding to the address of the tenant.

5. The system of claim 4, wherein the second automated ground delivery vehicle is configured to access the parcel stored in the parcel storage box.

6. The system of claim 5, wherein the second automated ground delivery vehicle is configured to open the parcel storage box in the delivery facility by transmitting an RFID signal to a corresponding receiving on the parcel storage box.

7. The system of claim 6, wherein the second automated ground delivery vehicle is configured to retrieve the parcel from the parcel storage box and deliver the parcel to the unit corresponding to the address of the tenant.

8. The system of claim 7, wherein delivery comprises delivering the parcel to a secure doorstep storage box located outside the tenant's unit.

9. The system of claim 7, wherein delivery comprises delivering the parcel into the tenant's unit by inserting the parcel through a secure access door, the secure access door providing access to the tenant's unit.

10. The system of claim 9 wherein the secure access door is automatically movable between a closed position, a partially open position, and a fully open position based on an input received to a signal receiver in communication with a secure access door controller.

11. A parcel delivery system comprising:
a complex having a plurality of tenant units each having a tenant address, the complex further comprising an intake facility, a delivery facility, and parcel storage boxes in communication with both the intake facility and the delivery facility;
a parcel for delivery to one of the plurality of tenant units bearing an address of a tenant;
wherein the intake facility comprises a scanning station and a first automated ground delivery vehicle in communication with the scanning station and wherein the delivery facility comprises a second automated ground delivery vehicle configured to automatically travel between the delivery facility and the plurality of tenant units; and wherein the second automated ground delivery vehicle is operable to deliver the parcel to the one of the plurality of units from the delivery facility; and wherein the second automated ground delivery vehicle comprises an electrical source, the electrical source connectable to a motor of a secure access door controller and operable to provide an electrical power to operate the motor.

12. The system of claim 2, further comprising a computer system in communication with the scanning station.

13. The system of claim 12, wherein the computer system receives the destination information as an input and provides an output notification to a computer associated with the address of the tenant that a parcel has been received bearing the address of the tenant.

14. The system of claim 13, wherein the output notification comprises at least one of an email, a text message, or a phone call, or mobile app notification.

15. The system of claim 14, wherein the computer system is operable to receive a reply input from the tenant to indicate to the parcel delivery system a time the parcel should be delivered.

16. The system of claim 15, wherein the computer system is operable to receive a reply input from the tenant to request a delivery time.

17. The system of claim 16, wherein the reply input received from the tenant is processed by the computer system and communicated to the second automated ground delivery vehicle at the requested delivery time.

18. The system of claim 1 wherein the intake facility comprises an air drone station, the first automated ground delivery vehicle operable to convey the parcel from the air drone station to the parcel storage boxes.

19. The system of claim 1 wherein the intake facility comprises an air drone station, the second automated ground delivery vehicle operable to retrieve the parcel from the air drone station before delivering the parcel to the one of the plurality of units from the delivery facility.

20. A parcel delivery system comprising:
a complex having a plurality of tenant units each having a tenant address, the complex further comprising an intake facility, a delivery facility, and parcel storage boxes in communication with both the intake facility and the delivery facility;
a parcel for delivery to one of the plurality of tenant units bearing an address of a tenant;
wherein the intake facility comprises a scanning station and a first automated ground delivery vehicle in communication with the scanning station and wherein the delivery facility comprises a second automated ground delivery vehicle configured to automatically travel between the delivery facility and the plurality of tenant units; and wherein the second automated ground delivery vehicle is operable to deliver the parcel to the one of the plurality of units from the delivery facility;
wherein the scanning station scans a marker of the at least one parcel to collect a destination information;
wherein the destination information comprises the address of the tenant;
wherein the destination information is communicated to the first automated ground delivery vehicle;
wherein the first automated ground delivery vehicle places the parcel in a parcel storage locker corresponding to the address of the tenant;
wherein the second automated ground delivery vehicle is configured to access the parcel stored in the parcel storage box;
wherein the second automated ground delivery vehicle is configured to open the parcel storage box in the delivery facility by transmitting an RFID signal to a corresponding receiving on the parcel storage box;
wherein the second automated ground delivery vehicle is configured to retrieve the parcel from the parcel storage box and deliver the parcel to the unit corresponding to the address of the tenant;
wherein delivery comprises delivering the parcel into the tenant's unit by inserting the parcel through a secure access door, the secure access door providing access to the tenant's unit;
wherein the secure access door is automatically movable between a closed position, a partially open position, and a fully open position based on an input received to a signal receiver in communication with a secure access door controller;
wherein the second automated ground delivery vehicle comprises an electrical source, the electrical source connectable to a motor of the secure access door controller and operable to provide an electrical power to operate the motor.

\* \* \* \* \*